US009939717B2

(12) United States Patent
Mizutani et al.

(10) Patent No.: US 9,939,717 B2
(45) Date of Patent: Apr. 10, 2018

(54) PROJECTOR AND CONTROL METHOD FOR PROJECTOR

(71) Applicant: SEIKO EPSON CORPORATION, Tokyo (JP)

(72) Inventors: Tomoya Mizutani, Azumino (JP); Takaaki Ozawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/387,283

(22) Filed: Dec. 21, 2016

(65) Prior Publication Data

US 2017/0205693 A1    Jul. 20, 2017

(30) Foreign Application Priority Data

Jan. 20, 2016    (JP) ................................ 2016-008503

(51) Int. Cl.
| | |
|---|---|
| *G03B 21/16* | (2006.01) |
| *G03B 21/20* | (2006.01) |
| *H04N 9/31* | (2006.01) |
| *H05B 41/292* | (2006.01) |
| *G03B 21/00* | (2006.01) |
| *G03B 33/12* | (2006.01) |
| *H05B 41/288* | (2006.01) |

(52) U.S. Cl.
CPC ......... *G03B 21/16* (2013.01); *G03B 21/2026* (2013.01); *G03B 21/2046* (2013.01); *G03B 21/2053* (2013.01); *H05B 41/2885* (2013.01); *H05B 41/292* (2013.01); *G03B 21/006* (2013.01); *G03B 21/2066* (2013.01); *G03B 33/12* (2013.01); *H04N 9/3155* (2013.01); *H05B 41/2887* (2013.01); *Y02B 20/202* (2013.01)

(58) Field of Classification Search
CPC .............. G03B 21/145; G03B 21/2053; G03B 21/206; G03B 21/16; G03B 21/14; G03B 21/2026; G03B 21/2046; H05B 41/292; H05B 41/2985; H05B 41/2988; H04N 9/3155
USPC .................................................... 353/85, 119
See application file for complete search history.

(56) References Cited

U.S. PATENT DOCUMENTS

| | | | | |
|---|---|---|---|---|
| 2008/0111976 A1* | 5/2008 | Takito | .................... | G03B 21/10 353/121 |
| 2011/0128508 A1* | 6/2011 | Yamada | ............. | H05B 41/2883 353/85 |
| 2012/0033187 A1* | 2/2012 | Kotani | ................... | G03B 21/16 353/57 |

* cited by examiner

*Primary Examiner* — William C Dowling
*Assistant Examiner* — Ryan Howard
(74) *Attorney, Agent, or Firm* — Oliff PLC

(57) ABSTRACT

A projector which configured to project a horizontally long image and a vertically long image, includes a cooling unit configured to cool a discharge lamp according to an installation attitude of the projector, a detection unit configured to detect the installation attitude, and a controller configured to control a discharge lamp driving unit and the cooling unit, in which the installation attitude includes a first attitude for projecting the horizontally long image and a second attitude for projecting the vertically long image, and in which the controller is configured to put out the discharge lamp in a case where the installation attitude detected by the detection unit is a third attitude which is different from both of the first attitude and the second attitude.

13 Claims, 11 Drawing Sheets

PROJECTOR AND CONTROL METHOD FOR PROJECTOR

BACKGROUND

1. Technical Field

The present invention relates to a projector and a control method for the projector.

2. Related Art

There is a projection type display apparatus which can display not only a horizontally long projection image but also vertically long projection image by changing an installation attitude (for example, refer to JP-A-2015-60080).

In a case where a discharge lamp is used as a light source of such a projection type display apparatus, a location which is heated most in the discharge lamp differs depending on an installation attitude of the projection type display apparatus. Thus, there is a case where it is hard to sufficiently cool the discharge lamp depending on an installation attitude of the projection type display apparatus. Therefore, there is a problem in that deterioration in the discharge lamp accelerates, and thus the service life of the discharge lamp is reduced.

SUMMARY

An advantage of some aspects of the invention is to provide a projector which can project a horizontally long image and a vertically long image, and can minimize a reduction in the service life of a discharge lamp. Another advantage of some aspects of the invention is to provide a control method for a projector, capable of minimizing a reduction in the service life of a discharge lamp in a projector which can project a horizontally long image and a vertically long image.

An aspect of the invention is directed to a projector configured to project a horizontally long image and vertically long image, and includes a discharge lamp which is provided with a first electrode and a second electrode and configured to emit light; a discharge lamp driving unit configured to supply a driving current to the discharge lamp; a light modulation device configured to modulate the light emitted from the discharge lamp according to image information; a projection optical device configured to project the light modulated by the light modulation device; a cooling unit configured to cool the discharge lamp according to an installation attitude of the projector; a detection u configured to detect the installation attitude; and a controller configured to control the discharge lamp driving unit and the cooling unit, which the installation attitude includes a first attitude for projecting the horizontally long image and a second attitude for projecting the vertically long image, and in which the controller is configured to put out the discharge lamp in a case where the installation attitude detected by the detection unit is a third attitude which is different from both of the first attitude and the second attitude.

According to the aspect of the invention relating to the projector, in a case of the third attitude which is different from both of the first attitude and the second attitude, the discharge lamp is put out. Thus, even in a case where the discharge lamp is insufficiently cooled by the cooling unit in the third attitude, it is possible to prevent deterioration in the discharge lamp from accelerating. Consequently, it is possible to improve the service life of a discharge lamp.

The aspect of the invention may be configured such that the second attitude and the third attitude are attitudes in which the first electrode and the second electrode are disposed to be arranged in a vertical direction; in the second attitude, one of the first electrode and the second electrode is disposed further toward a vertically upper side than the other electrode; and, in the third attitude, the other electrode is disposed further toward the vertically upper side than the one electrode.

According to this configuration, it is possible to simplify a structure of a cooling device and to improve the service life of a discharge lamp.

The aspect of the invention may be configured such that the third attitude is an attitude in which the discharge lamp is insufficiently cooled by the cooling unit.

According to this configuration, it is possible to prevent a discharge lamp from being excessively heated.

The aspect of the invention may be configured such that the second attitude is an attitude obtained by rotating the projector so that a projection direction of light projected from the projection optical device is substantially the same as a projection direction of light in the first attitude.

According to this configuration, a projector can be disposed in both a vertical attitude and a horizontal attitude, and thus it is possible to improve a user's convenience.

The aspect of the invention may be configured such that the controller is configured to perform a notification of a warning in a case where the detected installation attitude is the third attitude, and is configured to put out the discharge lamp after a predetermined time elapses from the notification of the warning.

According to this configuration, it is possible to improve a user's convenience.

The aspect of the invention may be configured such that the projector further includes an input unit configured to receive an input of a setting attitude of the projector, and the controller is configured to set the setting attitude according to the input received by the input unit, and is configured to perform a notification of a warning in a case where the detected installation attitude is different from the setting attitude.

According to this configuration, it is possible to further improve the service life of a discharge lamp.

The aspect of the invention may be configured such that the controller is configured to change an output from the cooling unit according to the setting attitude.

According to this configuration, it is possible to appropriately cool a discharge lamp.

Another aspect of the invention is directed to a control method for a projector which includes a discharge lamp emitting light and configured to project a horizontally long image and a vertically long image, the method including cooling the discharge lamp according to an installation attitude of the projector; detecting the installation attitude; and putting out the discharge lamp in a case where the detected installation attitude is a third attitude which is different from both of a first attitude for projecting the horizontally long image and a second attitude for projecting the vertically long image.

According to the aspect of the invention relating to the control method for a projector, it is possible to improve the service life of a discharge lamp in the same manner as described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
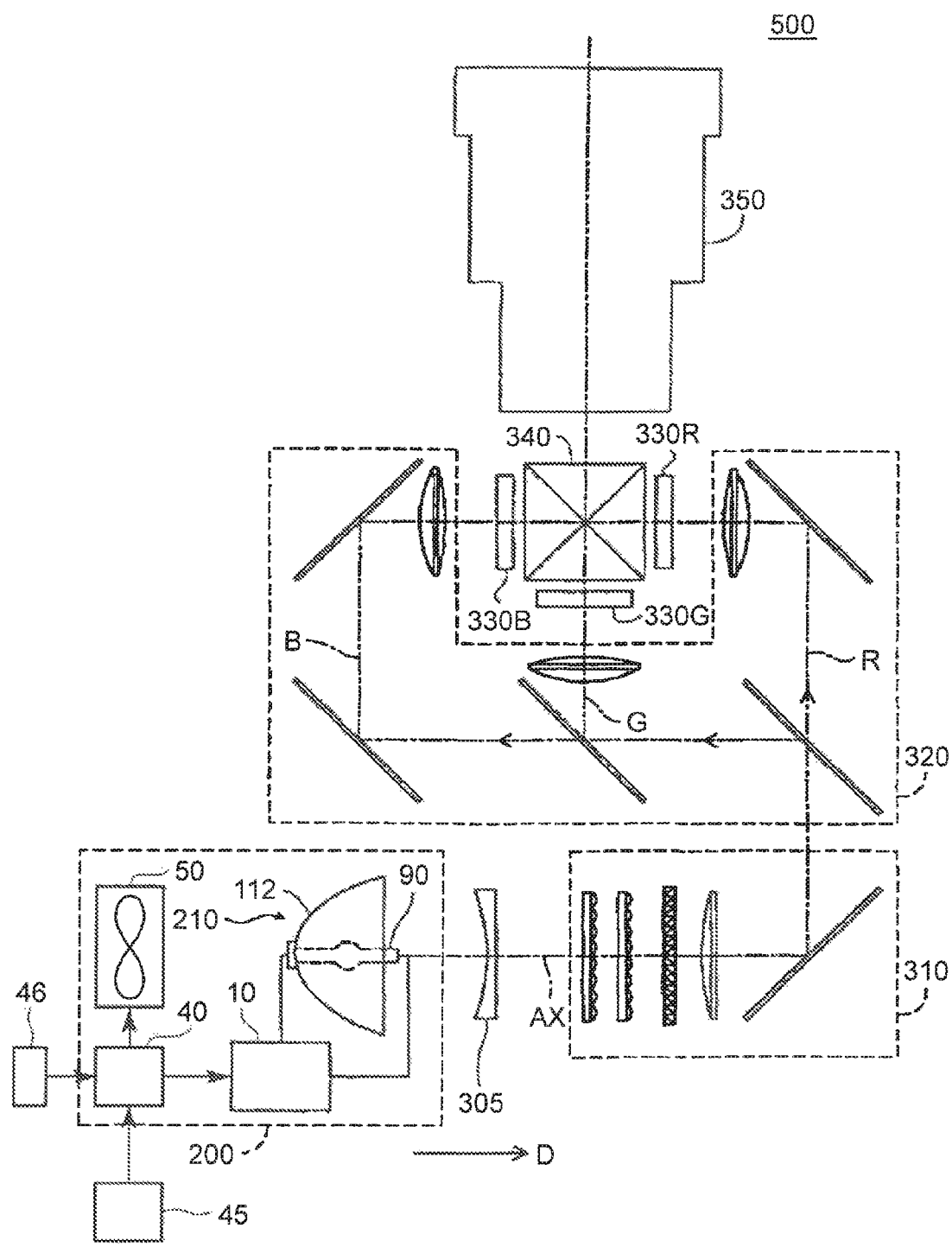
FIG. 1 is a schematic configuration diagram illustrating a projector according to the present embodiment.

Hereinafter, with reference to the drawings, a projector according to an embodiment of the invention will be described.

The scope of the invention is not limited to the following embodiments, and can be arbitrarily changed within the scope of the technical spirit of the invention. In the following drawings, for better understanding of each constituent element, a scale, the number, and the like thereof in each structure may be different from a scale, the number, and the like thereof in an actual structure.

In the drawings, an XYZ coordinate system is used as a three-dimensional orthogonal coordinate system as appropriate. In the XYZ coordinate system, a Z axis direction is a vertical direction. A Y axis direction and an X axis direction are horizontal directions which are orthogonal to the Z axis direction, and are orthogonal to each other. In the following description, a positive side (+Z side) of the Z axis direction will be referred to as a vertically upper side in some cases, and a negative side (−Z side) of the Z axis direction will be referred to as a vertically lower side in some cases.

FIG. 1 is a schematic configuration diagram of a projector 500 according to the present embodiment. The projector 500 can project a horizontally long image and a vertically long image. As illustrated in FIG. 1, the projector 500 of the present embodiment includes a light source apparatus 200, a collimating lens 305, an illumination optical system 310, a color separation optical system 320, three liquid crystal light valves (light modulation devices) 330R, 330G and 330B, a cross dichroic prism 340, a projection optical system (projection optical device) 350, an input unit 45, and an acceleration sensor (detection unit) 46.

Light emitted from the light source apparatus 200 passes through the collimating lens 305 and is incident to the illumination optical system 310. The collimating lens 305 collimates the light from the light source apparatus 200.

The illumination optical system 310 adjusts the illuminance of the light emitted from the light source apparatus 200 so that the illuminance is uniformized on the liquid crystal light valves 330R, 330G and 330B. The illumination optical system 310 aligns polarization directions of the light emitted from the light source apparatus 200 in one direction. This is aimed at effectively using the light emitted from the light source apparatus 200 in the liquid crystal light valves 330R, 330G and 330B.

The light having undergone the adjustment of the illuminance distribution and the polarization directions is incident to the color separation optical system 320. The color separation optical system 320 separates the incident light into three color light beams including red light (R), green light (G), and blue light (B). The three color light beams are respectively modulated according to video signals (image information) by the liquid crystal light valves 330R, 330G and 330B which correspond to the respective color light beams. In other words, the liquid crystal light valves 330R, 330G and 330B modulate light emitted from a discharge lamp 90 according to image information. The liquid crystal light valves 330R, 330G and 330B respectively include liquid crystal panels 560R, 560G and 560B which will be described later, and polarization plates (not illustrated). The polarization plates are disposed on a light incidence side and a light emission side of each of the liquid crystal panels 560R, 560G and 560B.

The three modulated color light beams are combined with each other by the cross dichroic prism 340. The combined light is incident to the projection optical system 350. The projection optical system 350 projects the incident light onto a screen 700 (refer to FIG. 6). In other words, the projection optical system 350 projects the light modulated by the liquid crystal light valves 330R, 330G and 330B. Thus, a video is displayed on the screen 700. In addition, well-known configurations may be employed as configurations of the collimating lens 305, the illumination optical system 310, the color separation optical system 320, the cross dichroic prism 340, and the projection optical system 350.

The light source apparatus 200 includes a light source unit 210, a discharge lamp lighting device 10, a control device (controller) 40, and a cooling device (cooling unit) 50.

Figure 2:
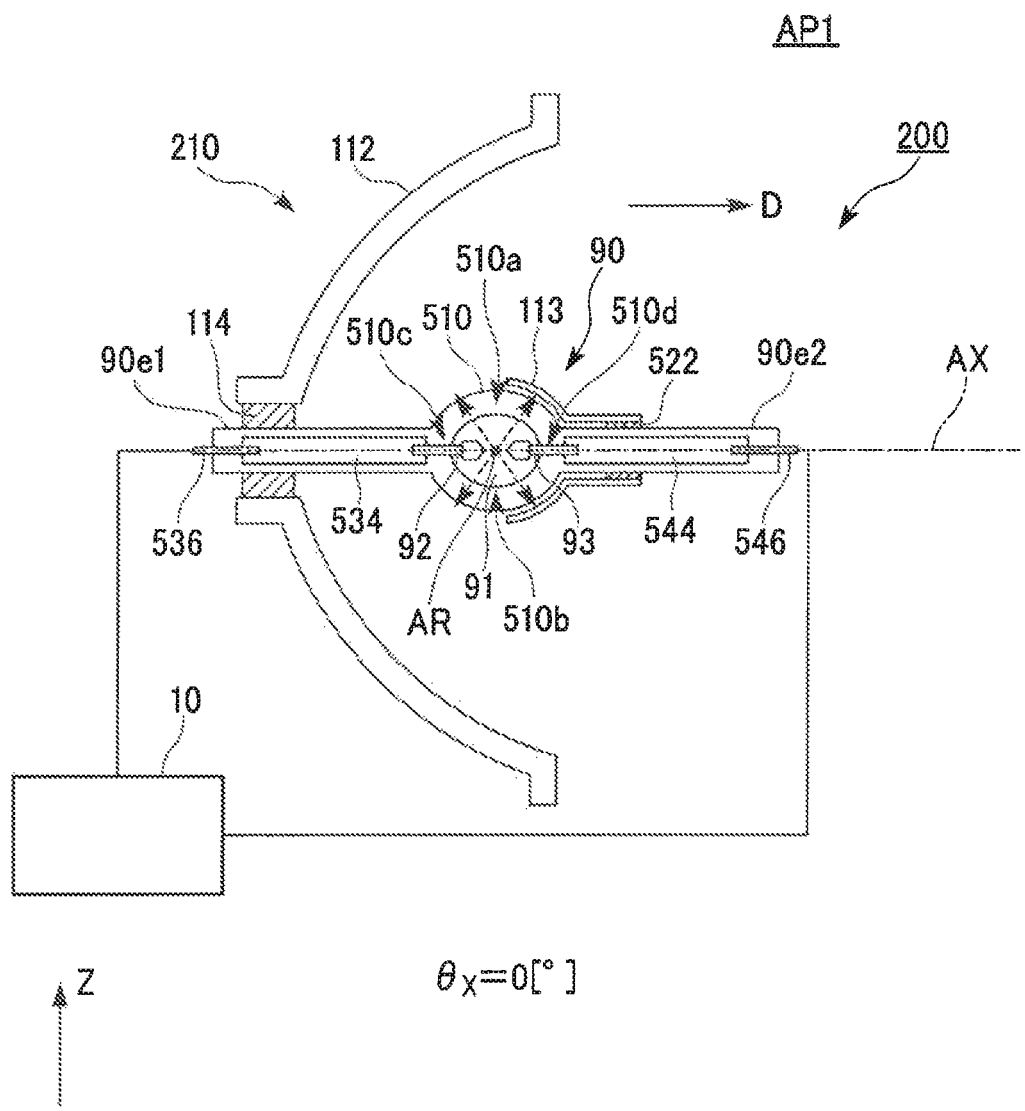
FIG. 2 is a sectional view illustrating a configuration of a light source apparatus according to the present embodiment, and is a diagram illustrating arrangement of the light source apparatus in a horizontal attitude.

FIG. 2 is a sectional view illustrating a configuration of the light source apparatus 200. FIG. 2 shows a sectional view of the light source unit 210. In FIG. 2, the control device 40 and the cooling device 50 are not illustrated.

As illustrated in FIG. 2, the light source unit 210 includes the discharge lamp 90, a main reflection mirror (reflection mirror) 112, and a subsidiary reflection mirror 113. The discharge lamp 90 emits light. The discharge lamp lighting device 10 supplies a driving current I to the discharge lamp 90 so as to light the discharge lamp 90. The main reflection mirror 112 reflects the light emitted from the discharge lamp 90 in an irradiation direction D. The irradiation direction D is parallel to an optical axis AX of the discharge lamp 90.

The discharge lamp 90 includes a discharge lamp main body 510, a first electrode 92, and a second electrode 93. The discharge lamp main body 510 has a rod shape extending in the irradiation direction D. One end of the discharge lamp main body 510, that is, one end of the discharge lamp 90 is referred to as a first end 90e1. The other end of the discharge lamp main body 510, that is, the other end of the discharge lamp 90 is referred to as a second end 90e2. A material of the discharge lamp main body 510 is, for example, a light transmissive material such as quartz glass. A central portion of the discharge lamp main body 510 is swollen in a spherical shape, and the inside thereof is a discharge space 91. A gas which is a discharge medium containing mercury, rare gases, metal halogen compounds, and the like is enclosed in the discharge space 91.

Tips of a first electrode 92 and a second electrode 93 protrude in the discharge space 91. The first electrode 92 is disposed on the first end 90e1 side of the discharge space 91. The second electrode 93 is disposed on the second end 90e2 side of the discharge space 91. Each of the first electrode 92 and the second electrode 93 has a rod shape extending in the optical axis AX. The tips of the first electrode 92 and the second electrode 93 are disposed to face each other with a predetermined distance in the discharge space 91. A material of each of the first electrode 92 and the second electrode 93 is, for example, a metal such as tungsten.

The discharge lamp main body 510 includes a first wall 510a to a fourth wall 510d which are inner walls surrounding the discharge space 91. The first wall 510a and the second wall 510b are walls which are disposed on both end sides in a direction (a vertical direction in FIG. 2) orthogonal to the direction in which the first electrode 92 and the second electrode 93 are arranged with respect to the discharge space 91. In FIG. 2, the first wall 510a is a wall located on an upper end side of the discharge space 91, and the second wall 510b is a wall located on a lower end side of the discharge space.

The third wall 510c and the fourth wall 510d are walls which are disposed on both end sides in the direction (a horizontal direction in FIG. 2) in which the first electrode 92 and the second electrode 93 are arranged with respect to the discharge space 91. In FIG. 2, the third wall 510c is a wall located on the first electrode 92 side (the left side in FIG. 2) of the discharge space 91, and the fourth wall 510d is a wall located on the second electrode 93 side (the right side in FIG. 2) of the discharge space 91.

Figure 3:
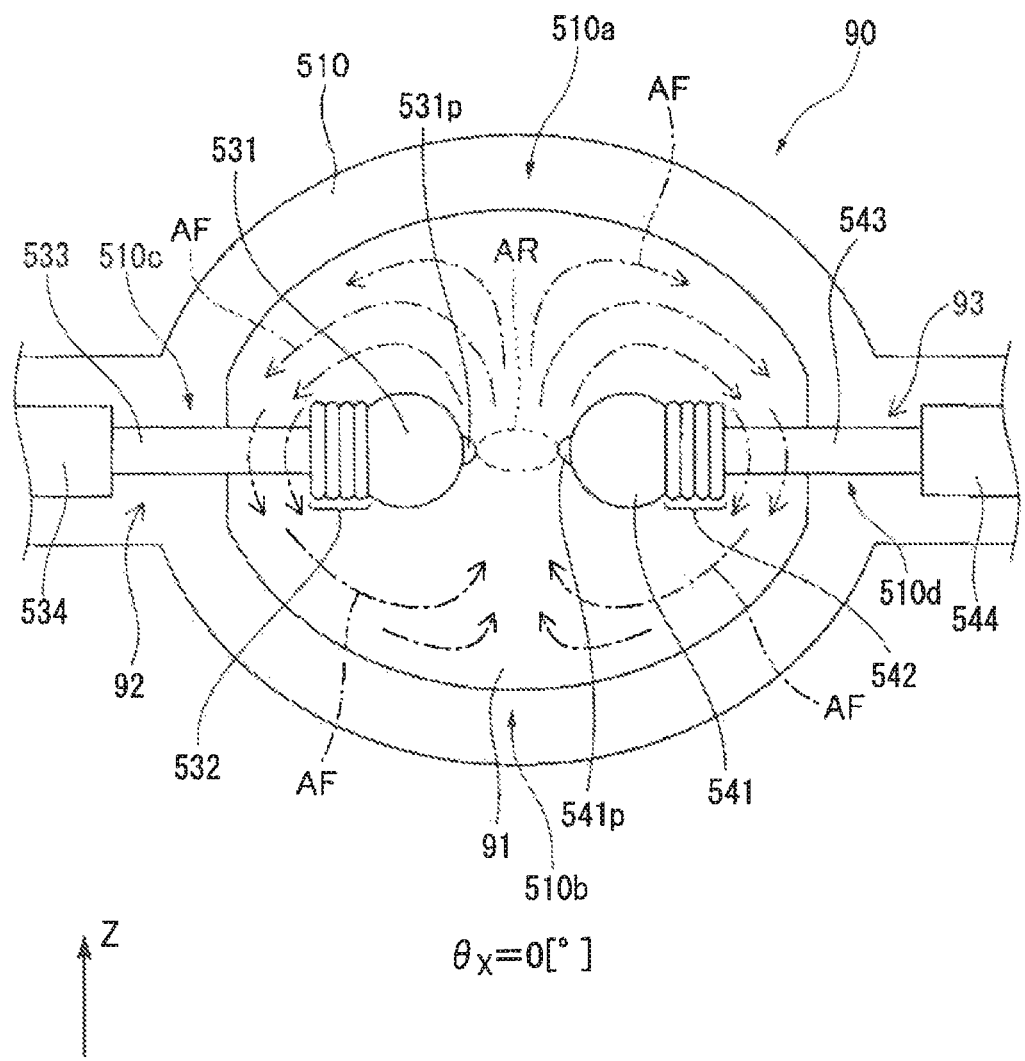
FIG. 3 is a partially enlarged sectional view of a discharge lamp according to the present embodiment.

FIG. 3 is an enlarged sectional view illustrating a part of the discharge lamp 90.

As illustrated in FIG. 3, the first electrode 92 includes a core rod 533, a coil portion 532, a main body portion 531, and a protrusion 5319p. The first electrode 92 is formed by winding a wire material as an electrode material (tungsten or the like) on the core rod 533 in a stage of being enclosed in the discharge lamp main body 510 so as to form the coil portion 532 and by heating and melting the formed coil portion 532. Consequently, the main body portion 531 having a large thermal capacity and the protrusion 531p where an arc AR is generated are formed on a tip side of the first electrode 92.

The second electrode 93 includes a core rod 543, a coil portion 542, a main body portion 541, and a protrusion 541p. The second electrode 93 is formed in the same manner as the first electrode 92.

The first electrode 92 and the second electrode 93 have the same configuration, and, thus, in the following description, only the first electrode 92 will be described as a representative in some cases. The protrusion 531p of the first electrode 92 and the protrusion 541p of the second electrode 93 have the same configuration, and, thus, in the following description, only the protrusion 531p will be described as a representative in some cases.

As illustrated in FIG. 2, a first terminal 536 is provided at the first end 90e1 of the discharge lamp 90. The first terminal 536 and the first electrode 92 are electrically connected to each other via a conductive member 534 which penetrates through the discharge lamp 90. Similarly, a second terminal 546 is provided at the second end 90e2 of the discharge lamp 90. The second terminal 546 and the second electrode 93 are electrically connected to each other via a conductive member 544 which penetrates through the discharge lamp 90. A material of each of the first terminal 536 and the second terminal 546 is, for example, a metal such as tungsten. As a material of each of the conductive members 534 and 544, for example, a molybdenum foil is used.

The first terminal 536 and the second terminal 546 are connected to the discharge lamp lighting device 10. The discharge lamp lighting device 10 supplies the driving power for driving the discharge lamp 90 to the first terminal 536 and the second terminal 546. As a result, arc discharge occurs between the first electrode 92 and the second electrode 93. Light (discharge light) occurring due to the arc discharge is radiated in all directions from the discharge position as indicated by dashed arrows.

As illustrated in FIG. 3, if the discharge lamp 90 is lighted, a gas enclosed in the discharge space 91 is heated due to generation of the arc AR and undergoes convection in the discharge space 91. Specifically, since the temperature of the arc AR and a region therearound becomes considerably high, convections AF (indicated by a dot chain arrow in FIG. 3) which flow vertically upward from the arc AR is formed in the discharge space 91. The convections AF come into contact with the first wall 510a of the discharge lamp main body 510, moves along the third wall 510c and the fourth wall 510d from the first wall 510a of the discharge lamp main body 510, and descends while being cooled as a result of passing through the core rods 533 and 543 of the first electrode 92 and the second electrode 93.

The descending convections AF further descend along the third wall 510c and the fourth wall 510d of the discharge lamp main body 510, but come into contact with each other on a vertically lower side of the arc AR, and thus ascend so as to return to the upper arc AR. As a result of the convections AF moving along the inner walls (the first wall 510a to the fourth wall 510d) of the discharge lamp main body 510, the discharge lamp main body 510 is heated. Here, the temperature of the convections AF is highest on the vertically upper side of the arc AR, and is lowest on the vertically lower side of the arc AR. Thus, the wall of the discharge lamp main body 510 which comes into contact with the convections AF on the vertically upper side of the arc AR is the most heated portion whose temperature is highest in the discharge lamp main body 510 (discharge lamp 90). The wall of the discharge lamp main body 510 which comes into contact with the convections AF on the vertically lower side of the arc AR is the most cooled portion whose temperature is lowest in the discharge lamp main body 510 (discharge lamp 90).

In the example illustrated in FIG. 3, the first wall 510a is located on the vertically upper side of the arc AR, and thus the first wall 510a is the most heated portion whose temperature is highest. On the other hand, the second wall 510b is located on the vertically lower side of the arc AR, and thus the second wall 510b is the most cooled portion whose temperature is lowest.

As illustrated in FIG. 2, the main reflection mirror 112 is fixed to the first end 90e1 of the discharge lamp 90 via a fixation member 114. The main reflection mirror 112 reflects light which travels toward an opposite side to the irradiation direction D among discharge light beams, in the irradiation direction D. A shape of a reflection surface (a surface on the discharge lamp 90 side) of the main reflection mirror 112 is not particularly limited within a range in which discharge light can be reflected in the irradiation direction D, and may be, for example, a spheroidal shape or a rotating parabolic shape. For example, in a case where a shape of the reflection surface of the main reflection mirror 112 is a rotating parabolic shape, the main reflection mirror 112 can convert discharge light into light which is substantially parallel to the optical axis AX. Consequently, the collimating lens 305 can be omitted.

The subsidiary reflection mirror 113 is fixed to the second end 90e2 side of the discharge lamp 90 via a fixation member 522. A shape of a reflection surface (a surface on the discharge lamp 90 side) of the subsidiary reflection mirror 113 is a spherical shape which surrounds a portion of the discharge space 91 on the second end 90e2 side. The subsidiary reflection mirror 113 reflects light which travels toward an opposite side to the side on which the main reflection mirror 112 is disposed among the discharge light beams, toward the main reflection mirror 112. Consequently, it is possible to increase usage efficiency of the light radiated from the discharge space 91.

A material of each of the fixation members 114 and 522 is not particularly limited as long as the material is a heat resistant material which can resist heat generated from the discharge lamp 90, and is, for example, an inorganic adhesive.

Figure 4:
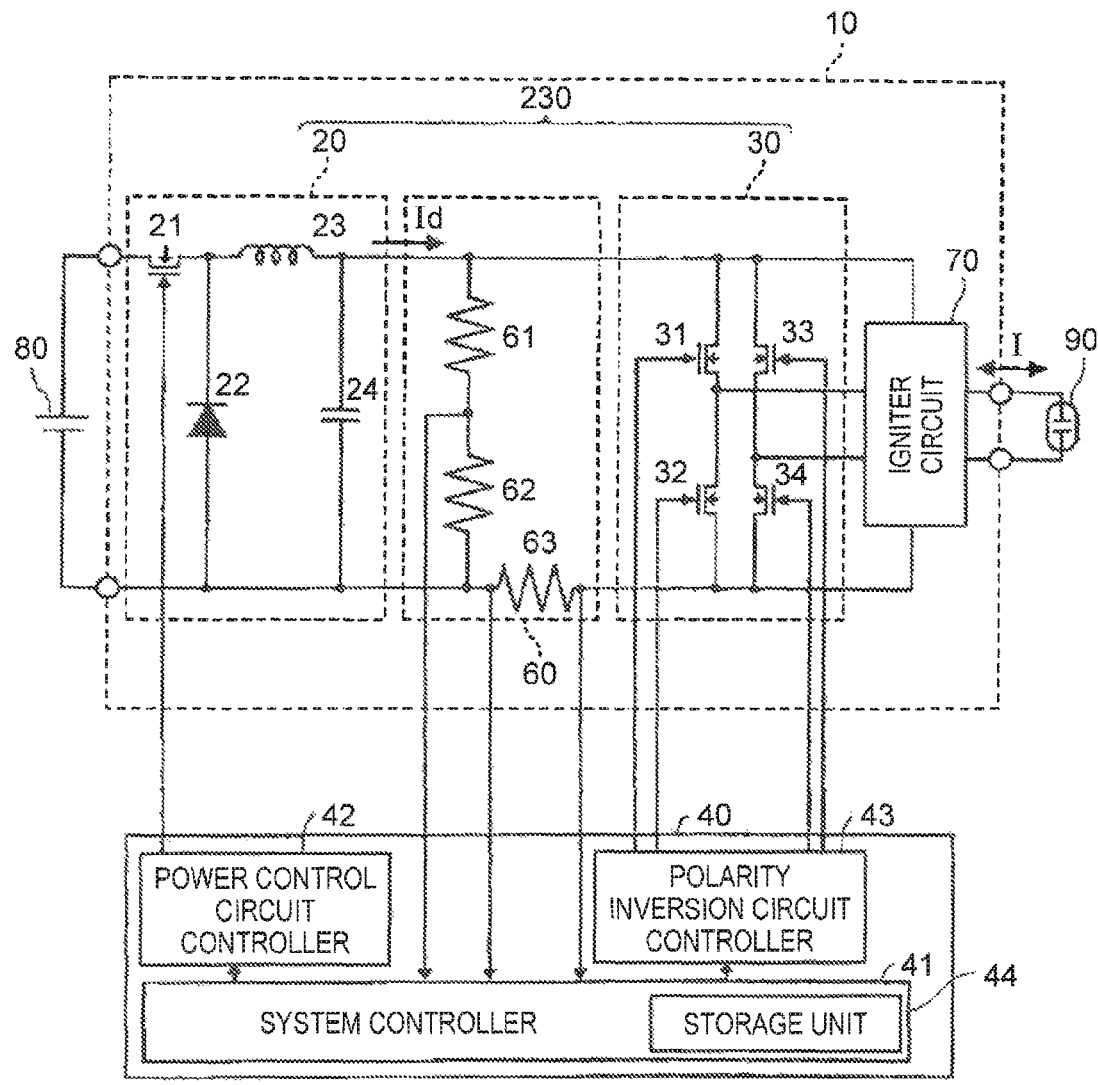
FIG. 4 is a circuit diagram illustrating a discharge lamp lighting device and a control device according to the present embodiment.

FIG. 4 is a diagram illustrating an example of a circuit configuration of the discharge lamp lighting device 10 and the control device 40.

As illustrated in FIG. 4, the discharge lamp lighting device 10 includes a power control circuit 20, a polarity inversion circuit 30, an operation detection unit 60, and an igniter circuit 70.

The power control circuit 20 generates the driving power which is supplied to the discharge lamp 90. In the present embodiment, the power control circuit 20 is constituted of a down chopper circuit which receives a voltage from the DC power source device 80 and outputs a DC current Id by stepping down the input voltage.

The power control circuit 20 is configured to include a switch element 21, a diode 22, a coil 23, and a capacitor 24. The switch element 21 is constituted of, for example, a transistor. In the present embodiment, one end of the switch element 21 is connected to a positive voltage side of the DC power source device 80, and the other end thereof is connected to a cathode terminal of the diode 22 and one end of the coil 23.

One end of the capacitor 24 is connected to the other end of the coil 23, and the other end of the capacitor 24 is connected to an anode terminal of the diode 22 and a negative voltage side of the DC power source device 80. A current control signal is input to a control terminal of the switch element 21 from the control device 40 and thus turning-on and turning-off of the switch element 21 are controlled. As the current control signal, for example, a pulse width modulation (PWM) control signal may be used.

If the switch element 21 is turned on, a current flows through the coil 23, and thus energy is accumulated in the coil 23. Thereafter, if the switch element 21 is turned off, the energy accumulated in the coil 23 is released along a path passing through the capacitor 24 and the diode 22. As a result, the DC current Id is generated which is proportional to a time period in which the switch element 21 is turned on.

The polarity inversion circuit 30 inverts a polarity of the DC current Id which is input from the power control circuit 20, at a predetermined timing. Consequently, the polarity inversion circuit 30 generates and outputs a driving current I as a DC which is continuously maintained only for a controlled time period, or a driving current I as an AC which has any frequency. In the present embodiment, the polarity inversion circuit 30 is constituted of an inverter bridge circuit (full bridge circuit).

The polarity inversion circuit 30 includes, for example, a first switch element 31, a second switch element 32, a third switch element 33, and a fourth switch element 34, constituted of transistors. The polarity inversion circuit 30 has a configuration in which the first switch element 31 and the second switch element 32 which are connected in series to each other are connected in parallel to the third switch element 33 and the fourth switch element 34 which are connected in series to each other. A polarity inversion control signal is input from the control device 40 to each of control terminals of the first switch element 31, the second switch element 32, the third switch element 33, and the fourth switch element 34. Turning-on and turning-off operations of each of the first switch element 31, the second switch element 32, the third switch element 33, and the fourth switch element 34 are controlled on the basis of the polarity inversion control signal.

In the polarity inversion circuit 30, an operation is repeatedly performed in which the first switch element 31 and the fourth switch element 34, and the second switch element 32 and the third switch element 33 are alternately turned on or off. Therefore, the polarities of the DC current Id output from the power control circuit 20 are alternately inverted. The polarity inversion circuit 30 generates and outputs a driving current I as a DC which is continuously maintained in the same polarity state only for a controlled time period or a driving current I as an AC having a controlled frequency, from a common connection point between the first switch element 31 and the second switch element 32, and a common connection point between the third switch element 33 and the fourth switch element 34.

In other words, in the polarity inversion circuit 30, the second switch element 32 and the third switch element 33 are controlled to be turned off when the first switch element 31 and the fourth switch element 34 are turned on, and the second switch element 32 and the third switch element 33 are controlled to be turned on when the first switch element 31 and the fourth switch element 34 are turned off. Thus, the driving current I is generated which flows in order of the first switch element 31, the discharge lamp 90, and the fourth switch element 34 from one end of the capacitor 24 when the first switch element 31 and the fourth switch element 34 are turned on. The driving current I is generated which flows in order of the third switch element 33, the discharge lamp 90, and the second switch element 32 from one end of the capacitor 24 when the second switch element 32 and the third switch element 33 are turned on.

In the present embodiment, the portion including the power control circuit 20 and the polarity inversion circuit 30 corresponds to a discharge lamp driving unit 230. In other words, the discharge lamp driving unit 230 supplies the driving current I for driving the discharge lamp 90 to the discharge lamp 90.

The operation detection unit 60 includes a voltage detection portion which detects a lamp voltage of the discharge lamp 90 and outputs lamp voltage information to the control device 40. The operation detection unit 60 may include a current detection portion or the like which detects the driving current I and outputs driving current information to the control device 40. In the present embodiment, the operation detection unit 60 is configured to include a first resistor 61, a second resistor 62, and a third resistor 63.

In the present embodiment, the voltage detection portion of the operation detection unit 60 detects a lamp voltage on the basis of a voltage divided by the first resistor 61 and the second resistor 62 which are connected in parallel to the discharge lamp 90 and are connected in series to each other. In the present embodiment, the current detection portion detects the driving current I on the basis of a voltage occurring at the third resistor 63 which is connected in series to the discharge lamp 90.

The igniter circuit 70 operates only at the time of starting of lighting of the discharge lamp 90. The igniter circuit 70 supplies a high voltage (a voltage higher than at normal lighting of the discharge lamp 90) which is necessary to cause dielectric breakdown between the electrodes (between the first electrode 92 and the second electrode 93) of the discharge lamp 90 and thus to form a discharge path, between the electrodes of the discharge lamp 90 (between the first electrode 92 and the second electrode 93) at the time of starting of lighting of the discharge lamp 90. In the present embodiment, the igniter circuit 70 is connected in parallel to the discharge lamp 90.

The control device 40 controls various operations from starting to stoppage of operations of the projector 500. The control device 40 controls the discharge lamp driving unit 230 according to a driving current waveform of the driving current I. The control device 40 controls the cooling device 50. In the example illustrated in FIG. 4, the control device 40 controls the power control circuit 20 and the polarity inversion circuit 30 so as to control parameters such as duration in which the driving current I is continuously maintained to have the same polarity, and a current value and a frequency of the driving current I. The control device 40 performs polarity inversion control for controlling the duration in which the driving current I is continuously maintained to have the same polarity, a frequency of the driving current I, and the like, on the polarity inversion circuit 30, on the basis of a polarity inversion timing of the driving current I. The control device 40 performs current control for controlling a current value of the output DC current Id on the power control circuit 20.

A configuration of the control device 40 is not particularly limited. In the present embodiment, the control device 40 is configured to include a system controller 41, a power control circuit controller 42, and a polarity inversion circuit controller 43. Some or all of the controllers of the control device 40 may be configured by using semiconductor integrated circuits.

The system controller 41 controls the power control circuit controller 42 and the polarity inversion circuit controller 43 so as to control the power control circuit 20 and the polarity inversion circuit 30. The system controller 41 may control the power control circuit controller 42 and the polarity inversion circuit controller 43 on the basis of a lamp voltage and a driving current I detected by the operation detection unit 60.

In the present embodiment, the system controller 41 is connected to a storage unit 44.

The system controller 41 may control the power control circuit 20 and the polarity inversion circuit 30 on the basis of information stored in the storage unit 44. The storage unit 44 may store, for example, information regarding driving parameters such as the duration in which the driving current I is continuously maintained to have the same polarity, a current value, a frequency, a waveform, and a modulation pattern of the driving current I.

The power control circuit controller 42 outputs a current control signal to the power control circuit 20 on the basis of a control signal from the system controller 41, so as to control the power control circuit 20.

The polarity inversion circuit controller 43 outputs a polarity inversion control signal to the polarity inversion circuit 30 on the basis of a control signal from the system controller 41, so as to control the polarity inversion circuit 30.

The control device 40 may be implemented by using a dedicated circuit so as to perform the above-described control or various control operations related to processes to be described later. In contrast, the control device 40 functions as a computer, for example, by the CPU executing a control program stored in the storage unit 44, so as to perform various control operations related to such processes.

Figure 5:
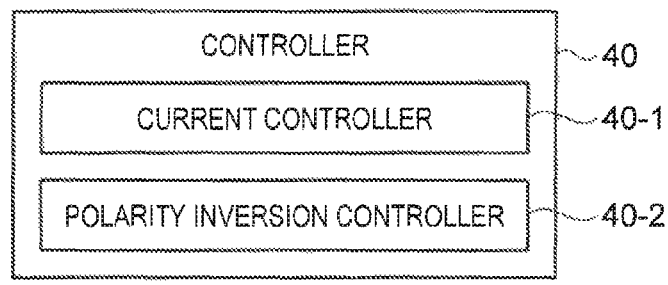
FIG. 5 is a block diagram illustrating a configuration example of the control device according to the present embodiment.

FIG. 5 is a diagram illustrating another configuration example of the control device 40. As illustrated in FIG. 5, the control device 40 may be configured to function as a current controller 40-1 which controls the power control circuit 20 and a polarity inversion controller 40-2 which controls the polarity inversion circuit 30 according to the control program.

The cooling device 50 illustrated in FIG. 1 includes, for example, a fan. The fan of the cooling device 50 is constituted of, for example, a sirocco fan. The fan of the cooling device 50 sucks cooled air in the casing of the projector 500 and sends the air to the light source unit 210. The cooling device 50 can cool the discharge lamp 90 of the light source unit 210 and the main reflection mirror 112 of the light source unit 210.

In the present embodiment, the cooling device 50 may include a single fan which can send air to the discharge lamp 90 and the main reflection mirror 112, and may include a fan which can send air to the discharge lamp 90 and a fan which can send air to the main reflection mirror 112.

Although not illustrated, the cooling device 50 includes an opening/closing mechanism which opens and closes an opening through which cooled air is discharged toward the light source unit 210. The opening/closing mechanism mechanically and automatically opens and closes the opening according to an attitude of the projector 500 by using the gravity. Consequently, a direction in which cooled air is discharged can be changed, and a portion to be cooled in the discharge lamp 90 can be changed according to an installation attitude SA of the projector 500.

The cooling device 50 sends cooled air toward, for example, a location which is the most heated portion of the discharge lamp main body 510. The most heated portion of the discharge lamp main body 510 changes depending on the installation attitude SA of the projector 500 (an attitude of the discharge lamp 90). The opening/closing mechanism changes a sending direction of cooled air according to a change of the installation attitude SA of the projector 500 so that the cooled air is sent to the most heated portion of the discharge lamp main body 510. In the examples illustrated in FIGS. 2 and 3, since the first wall 510a is the most heated portion, the opening/closing mechanism adjusts a sending direction of cooled air so that the cooled air is sent to the first wall 510a. As mentioned above, the cooling device 50 cools the discharge lamp 90 according to the installation attitude SA of the projector 500.

The input unit 45 illustrated in FIG. 1 receives a predetermined operation from a user. The input unit 45 receives user's operations, such as turning-on and turning-off of the supply of power to the projector 500, or changing of lighting modes. In the present embodiment, the input unit 45 is connected to the control device 40. In a case where a user's operation is received, the input unit 45 outputs an operation signal corresponding to the operation to the control device 40.

A method of the input unit 45 receiving an operation is not particularly limited. For example, the input unit 45 may receive an operation performed by pressing various buttons attached to a casing of the projector 500, and may receive an operation on the basis of a signal sent from a remote controller of the projector 500.

The acceleration sensor 46 detects the installation attitude SA of the projector 500. A configuration of the acceleration sensor 46 is not particularly limited. The acceleration sensor 46 sends information regarding the detected installation attitude SA of the projector 500 to the control device 40. A location where the acceleration sensor 46 is disposed is not particularly limited as long as the installation attitude SA can be detected.

Hereinafter, a circuit configuration of the projector 500 will be described.

Figure 6:
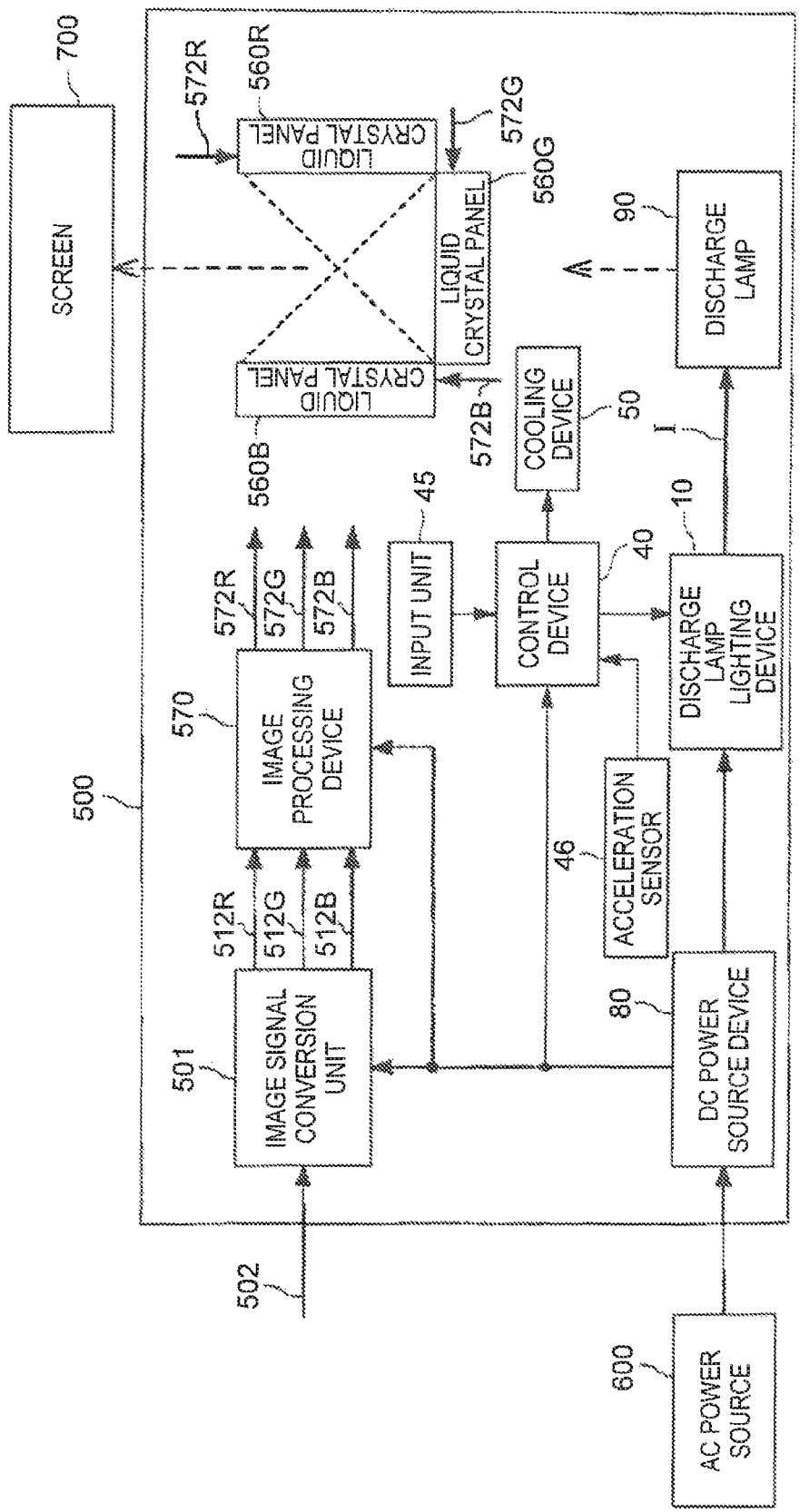
FIG. 6 is a block diagram illustrating various constituent elements of the projector according to the present embodiment.

FIG. 6 is a diagram illustrating an example of a circuit configuration of the projector 500 according to the present embodiment. The projector 500 includes, as illustrated in FIG. 6, an image signal conversion unit 501, a DC power source device 80, the liquid crystal panels 560R, 560G and 560B, and an image processing device 570, in addition to the configuration illustrated in FIG. 1.

The image signal conversion unit 501 converts image signals 502 (luminance-color difference signals, analog RGB signals, or the like) which are input from an external device into digital RGB signals with a predetermined word length so as to generate image signals 512R, 512G and 512B which are then supplied to the image processing device 570.

The image processing device 570 performs an image process on each of the three image signals 512R, 512G and 512B. The image processing device 570 supplies driving signals 572R, 572G and 572B for respectively driving the liquid crystal panels 560R, 560G and 560B, to the liquid crystal panels 560R, 560G and 560B.

The DC power source device 80 converts an AC voltage supplied from an external AC power source 600 into a constant DC voltage. The DC power source device 80 supplies DC voltages to the image signal conversion unit 501 and the image processing device 570 located on a secondary side of a transformer (not illustrated but included in the DC power source device 80) and the discharge lamp lighting device 10 located on a primary side of the transformer.

The discharge lamp lighting device 10 generates a high voltage between the electrodes of the discharge lamp 90 so as to cause dielectric breakdown and thus to form a discharge path during activation. Thereafter, the discharge lamp lighting device 10 supplies driving current for the discharge lamp 90 maintaining discharge.

The liquid crystal panels 560R, 560G and 560B are respectively provided in the above-described liquid crystal light valves 330R, 330G and 330B. The liquid crystal panels 560R, 560G and 560B modulate transmittance (luminance) of the color light beams which are respectively incident to the liquid crystal panels 560R, 560G and 560B via the above-described optical systems on the basis of the respective driving signals 572R, 572G and 572B.

Figure 7:
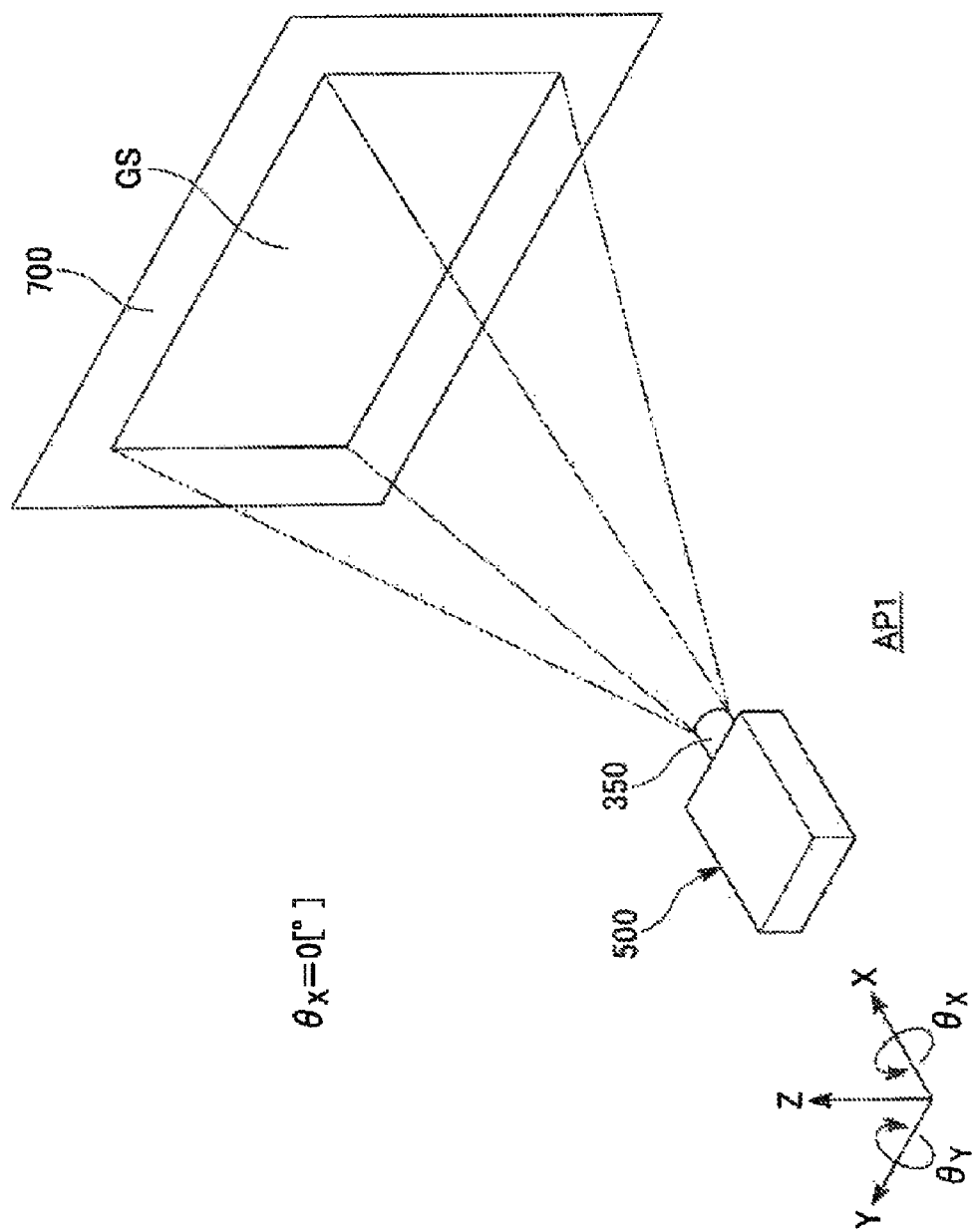
FIG. 7 is a perspective view illustrating an example of an installation attitude of the projector according to the present embodiment.
Figure 8:
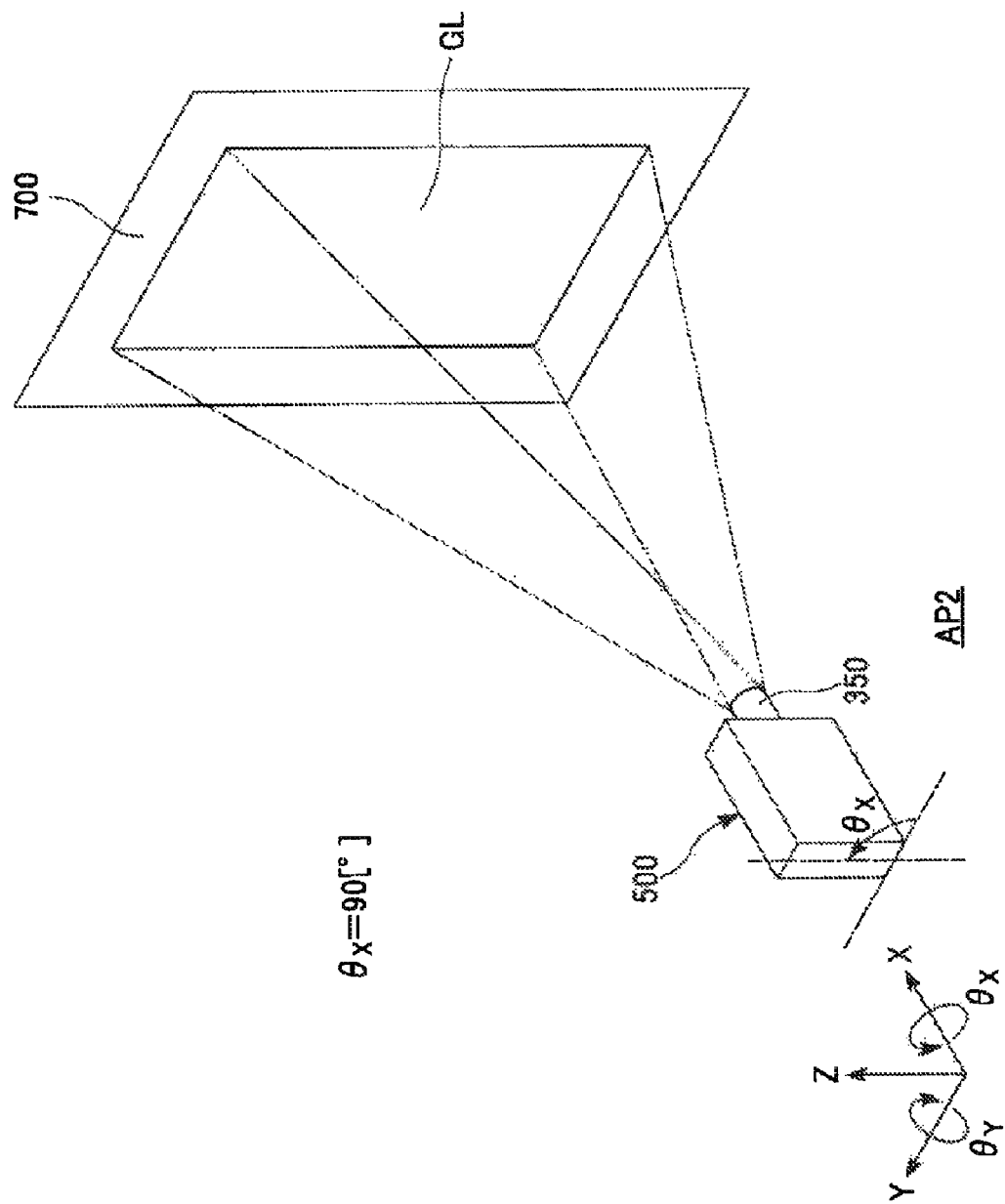
FIG. 8 is a perspective view illustrating an example of an installation attitude of the projector according to the present embodiment.

Next, the installation attitude SA of the projector 500 will be described. FIGS. 7 and 8 are perspective views illustrating the installation attitude SA of the projector 500. FIG. 7 illustrates a case where the projector 500 takes a horizontal attitude, and projects a horizontally long image GS onto the screen 700. FIG. 8 illustrates a case where the projector 500 takes a vertical attitude, and projects a vertically long image GL onto the screen 700. In FIGS. 7 and 8, a direction in which an image is projected from the projector 500 is illustrated as a direction which is substantially parallel to the X axis direction.

In the following description, the installation attitude SA of the projector 500 illustrated in FIG. 7 will be referred to as a horizontal attitude (first attitude) AP1, and the installation attitude SA of the projector 500 illustrated in FIG. 8 will be referred to as a vertical attitude (second attitude) AP2.

As illustrated in FIGS. 7 and 8, the projector 500 can be installed in the horizontal attitude AP1 and the vertical attitude AP2. That is, the installation attitude SA of the projector 500 includes the horizontal attitude AP1 and the vertical attitude AP2.

As illustrated in FIG. 7, the horizontal attitude AP1 is an attitude for projecting the horizontally long image GS. The horizontally long image GS is an image in which a horizontal dimension is larger than a vertical dimension when viewed from a user. In the example illustrated in FIG. 7, the horizontally long image GS has a dimension in the horizontal direction (Y axis direction) larger than a dimension in the vertical direction (Z axis direction)

As illustrated in FIG. 8, the vertical attitude AP2 is an attitude for projecting the vertically long image GL. The vertically long image GL is an image in which a vertical dimension is larger than a horizontal dimension when viewed from a user. In the example illustrated in FIG. 8, the vertically long image GL has a dimension in the vertical direction (Z axis direction) larger than a dimension in the horizontal direction (Y axis direction).

The vertical attitude AP2 is an attitude obtained by rotating the projector 500 so that a projection direction of light projected from the projection optical system 350 is substantially the same as that in the horizontal attitude AP1. In the examples illustrated in FIGS. 7 and 8, the vertical attitude AP2 is an attitude obtained by rotating the projector 500 by 90° about the X axis (θx direction) which is substantially parallel to the direction in which an image is projected with respect to the horizontal attitude AP1.

In the present embodiment, a rotation angle θx of the projector 500 about the X axis in the horizontal attitude AP1 illustrated in FIG. 7 is set to 0°. A direction of θx rotating counterclockwise from the projector 500 toward the screen 700 is assumed to be a positive direction, and the rotation angle θx about the X axis in the vertical attitude AP2 illustrated in FIG. 8 is set to 90°.

Next, a description will be made of arrangement of the electrodes in the horizontal attitude AP1 and the vertical attitude AP2. Regarding the arrangement of the discharge lamp 90 in the horizontal attitude AP1, as illustrated in FIGS. 2 and 3, the first electrode 92 and the second electrode 93 are disposed to be arranged in the horizontal direction orthogonal to the vertical direction (Z axis direction) in the horizontal attitude AP1, the first wall 510a of the discharge lamp main body 510 is located on the vertically upper side of the arc AR. Thus, the first wall 510a is the most heated portion. In the horizontal attitude AP1, the cooling device 50 sends cooled air toward the first wall 510a, for example.

Figure 9:
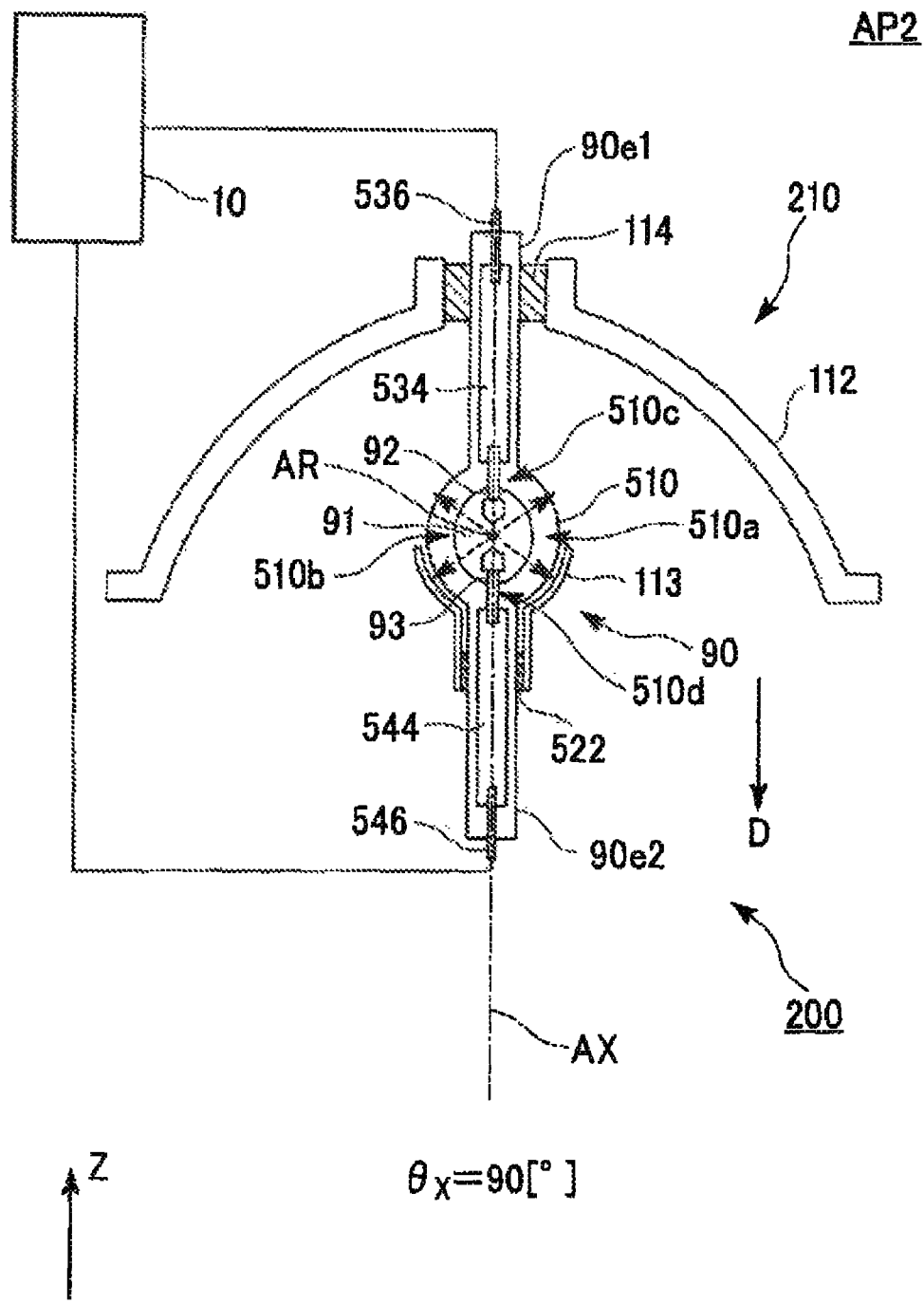
FIG. 9 is a diagram illustrating arrangement of the light source apparatus in a vertical attitude according to the present embodiment.

FIG. 9 is a diagram illustrating the arrangement of the light source apparatus 200 in the vertical attitude AP2. As illustrated in FIG. 9, the vertical attitude AP2 is an attitude in which the first electrode 92 and the second electrode 93 are disposed to be arranged in the vertical direction (Z axis direction). In the vertical attitude AP2, the first electrode 92 is disposed further toward the vertically upper side (+Z side) than the second electrode 93.

In the vertical attitude AP2, among the first wall 510a to the fourth wall 510d of the discharge lamp main body 510, the third wall 510c is located on the vertically upper side of the arc AR. Thus, in the vertical attitude AP2, the third wall 510c is the most heated portion. In the vertical attitude AP2, the cooling device 50 sends cooled air toward the third wall 510c, for example. In the vertical attitude AP2, the reflection surface of the main reflection mirror 112 faces the vertically lower side (−Z side), and light emitted from the discharge lamp 90 is applied vertically downward by the main reflection mirror 112.

The projector 500 of the present embodiment may be installed in attitudes other than the above-described horizontal attitude AP1 and vertical attitude AP2. In other words, the installation attitude SA of the projector 500 includes attitudes other than the horizontal attitude AP1 and the vertical attitude AP2. For example, the projector 500 may be installed in a range in which the rotation angle θx is 0° or more and 180° or less. For example, the projector 500 may be installed in the installation attitude SA obtained by rotating the projector 500 about ($\theta_y$ direction) a direction (Y axis direction) which is orthogonal to the vertical direction and is parallel to the screen 700 with respect to the horizontal attitude AP1.

In the present specification, the phrase that the projector can be installed includes that the projector is installed in an attitude in which the discharge lamp can be sufficiently cooled by the cooling device. The attitude in which the discharge lamp can be sufficiently cooled includes an attitude in which cooled air is sent from the cooling device toward a wall (most heated portion) located on the vertically upper side of the arc AR in the discharge lamp main body. In the following description, the installation attitude SA of the projector which can be installed will be referred to as an appropriate installation attitude SA in some cases.

Figure 10:
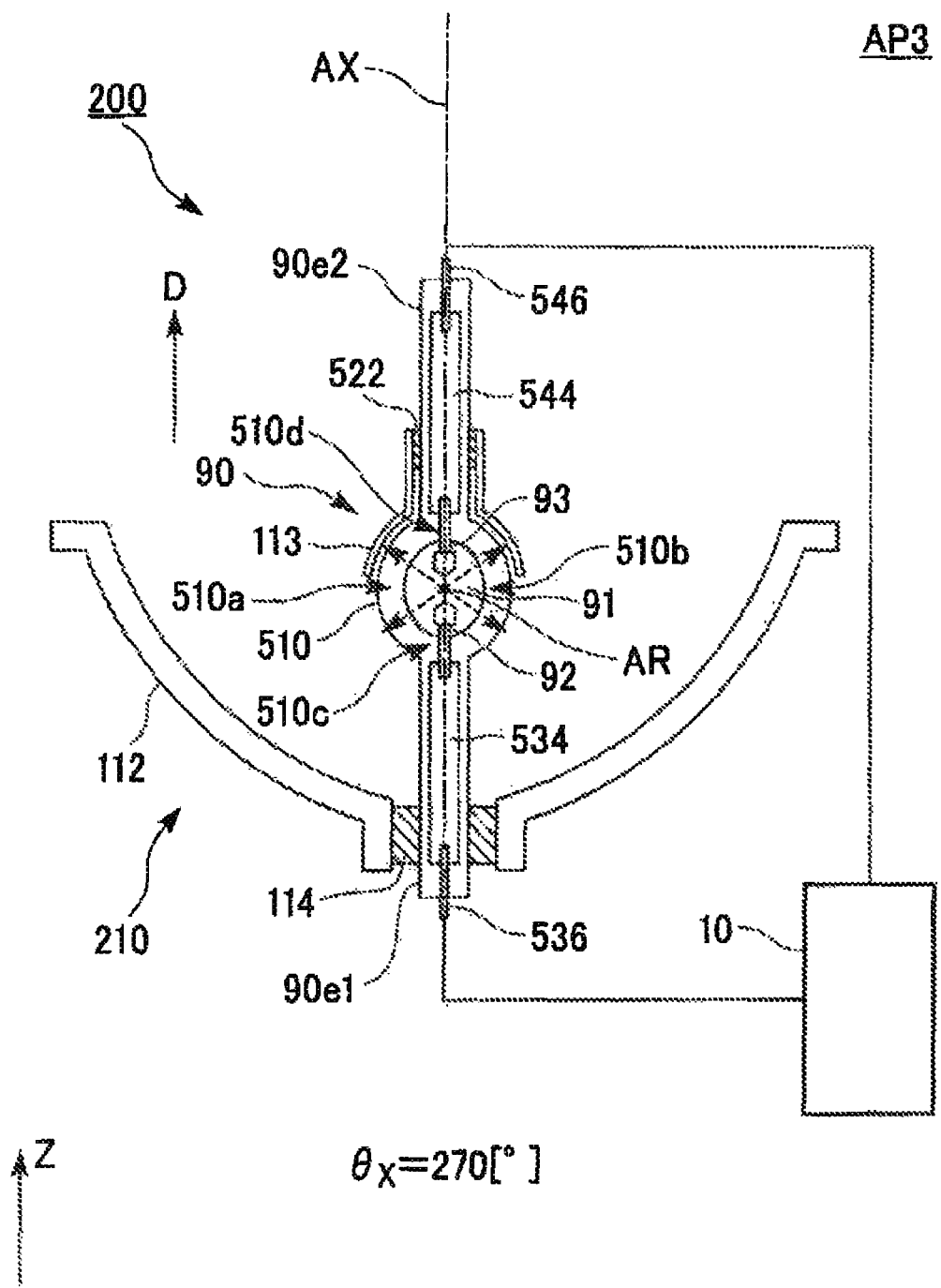
FIG. 10 is a diagram illustrating arrangement of the light source apparatus in a reverse vertical attitude according to the present embodiment.

On the other hand, there is the installation attitude SA in which the projector 500 of the present embodiment cannot be installed. FIG. 10 is a diagram illustrating the arrangement of the light source apparatus 200 in a reverse vertical attitude (third attitude) AP3. In the present embodiment, the reverse vertical attitude AP3 is the installation attitude SA in which the projector 500 cannot be installed. As illustrated in FIG. 10, the reverse vertical attitude AP3 is an attitude in which the first electrode 92 and the second electrode 93 are disposed to be arranged in the vertical direction. The rotation angle θx in the reverse vertical attitude AP3 is 270°. In other words, the reverse vertical attitude AP3 is an attitude vertically opposite to the vertical attitude AP2. In the reverse vertical attitude AP3, the second electrode 93 is disposed further toward the vertically upper side (+Z side) than the first electrode 92. In other words, in the vertical attitude AP2, one of the first electrode 92 and the second electrode 93 is disposed further toward the vertically upper side than the other electrode, and, in the reverse vertical attitude AP3, the other electrode is disposed further toward the vertically upper side than one electrode.

In the reverse vertical attitude AP3, among the first wall 510a to the fourth wall 510d of the discharge lamp main body 510, the fourth wall 510d is located on the vertically upper side of the arc AR. Thus, in the reverse vertical attitude AP3, the fourth wall 510d is the most heated portion. For example, in the present embodiment, the cooling device 50 cannot send cooled air toward the fourth wall 510d in the reverse vertical attitude AP3. Thus, the reverse vertical attitude AP3 is an attitude in which the discharge lamp 90 is insufficiently cooled by the cooling device 50. The reflection surface of the main reflection mirror 112 in the reverse vertical attitude AP3 faces vertically upward (+Z side), and thus light emitted from the discharge lamp 90 is applied vertically upward by the main reflection mirror 112.

In the present specification, the phrase that the projector cannot be installed includes that the projector is installed in an attitude in which the discharge lamp is insufficiently cooled by the cooling device. The attitude in which the discharge lamp is insufficiently cooled by the cooling device includes an attitude in which cooled air cannot be sent from the cooling device toward a wall (most heated portion) located on the vertically upper side of the arc AR in the discharge lamp main body. In addition, the attitude in which the discharge lamp is insufficiently cooled by the cooling device includes an attitude in which, even if cooled air is discharged from the cooling device toward a wall (most heated portion) located on the vertically upper side of the arc AR in the discharge lamp main body, the cooled air is blocked by a certain member such as the discharge lamp, and thus most of the cooled air does not reach the wall as the most heated portion. In the following description, the installation attitude SA of the projector which cannot be installed will be referred to as a predetermined attitude (third attitude) UA in some cases.

Figure 11:
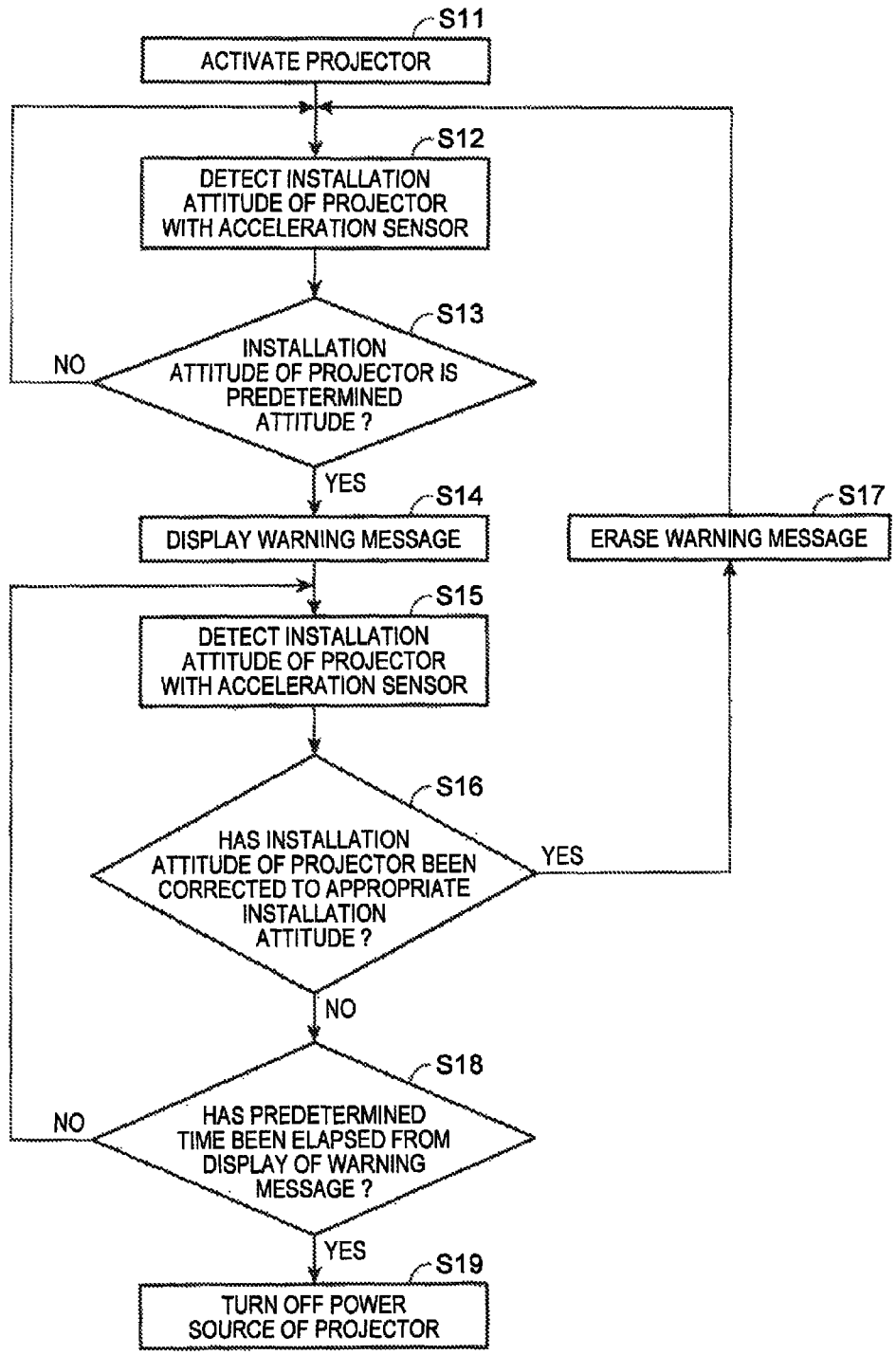
FIG. 11 is a flowchart illustrating examples of control procedures in a controller according to the present embodiment.

Next, a description will be made of control performed by the control device 40 of the present embodiment. FIG. 11 is a flowchart illustrating examples of control procedures in the control device 40 of the present embodiment. As illustrated in FIG. 11, after the projector 500 is activated (step S11), the control device 40 detects the installation attitude SA of the projector 500 by using the acceleration sensor 46 (step S12). The control device 40 determines whether or not the detected installation attitude SA of the projector 500 is the predetermined attitude UA (step S13).

In a case where the installation attitude SA of the projector 500 is not the predetermined attitude UA (NO in step S13), the control device 40 maintains the activation state of the projector 500 without chance, and continuously monitors the installation attitude SA by using the acceleration sensor 46. Here, the detection of the installation attitude SA using the acceleration sensor 46 (step S12), and the determination of the predetermined attitude UA (step S13) may be performed normally, and may be performed at a predetermined interval.

On the other hand, in a case where the installation attitude SA of the projector 500 is the predetermined attitude UA (YES in step S13), the control device 40 displays a warning message (step S14). In other words, in a case where the detected installation attitude SA of the projector 500 is the predetermined attitude UA, the control device 40 performs a notification of a warning. In the present embodiment, the predetermined attitude UA includes, for example, the reverse vertical attitude AP3. The content of the warning of which the notification is performed in this case includes that the installation attitude SA of the projector 500 is the predetermined attitude UA; in a case where the predetermined attitude UA is maintained, the power source of the projector 500 is turned off; and the installation attitude SA of the projector 500 is prompted to be corrected to the appropriate installation attitude SA.

The warning message may be displayed, for example, in an image projected onto the screen 700, and may be displayed on a display attached to the projector 500. A notification of a warning is not limited to a warning message, and is not particularly limited as long as a user is notified of a warning. A notification of a warning may be performed by using, for example, a voice, and may be performed through blinking of an indicator lamp attached to the projector 500.

After the notification of the warning is performed, the control device 40 detects the installation attitude SA of the projector 500 again by using the acceleration sensor 46 (step S15), and determines whether or not the installation attitude SA of the projector 500 has been corrected to the appropriate installation attitude SA from the predetermined attitude UA (step S16). In the present embodiment, the appropriate installation attitude SA includes the horizontal attitude AP1 and the vertical attitude AP2.

In a case where installation attitude SA of the projector 500 has been corrected to the appropriate installation attitude SA (YES in step S16), the control device 40 erases the warning message (step S17), and maintains the activation state of the projector 500.

On the other hand, in a case where installation attitude SA of the projector 500 is still the predetermined attitude UA (NO in step S16), the control device 40 determines whether or not a predetermined time has elapsed from the time of displaying the warning message (step S18). In a case where the predetermined time has not elapsed (NO in step S18), the control device 40 detects the installation attitude SA and determines whether or not the installation attitude SA has been corrected to the appropriate installation attitude SA again. In other words, in a case where the installation attitude SA is maintained to be the predetermined attitude UA, the control device 40 continuously performs the detection of the installation attitude SA and the determination of whether or not the installation attitude SA has been corrected, until the predetermined time elapses from the display of the warning message.

If the predetermined time has elapsed in a state in which the installation attitude SA of the projector 500 is not corrected from the predetermined attitude UA (YES in step S18), the control device 40 turns off the power source of the projector 500 (step S19). In other words, the control device 40 controls the discharge lamp driving unit 230 to put out the discharge lamp 90 after the predetermined time elapses from the notification of the warning. The predetermined time is, for example, about one minute or more and five minutes or less, As mentioned above, in a case where the installation attitude SA of the projector 500, detected by using the acceleration sensor 46, is the predetermined attitude UA (reverse vertical attitude AP3) which is different from the appropriate installation attitude SA (the horizontal attitude AP1 and the vertical attitude AP2), the control device 40 controls the discharge lamp driving unit 230 to put out the discharge lamp 90.

The above-described configuration may be expressed as a control method for the projector 500. In other words, according to an aspect of the projector 500 of the present embodiment, there is provided a control method for the projector 500 provided with the discharge lamp 90 emitting light and capable of projecting the horizontally long image GS and the vertically long image GL, the method including cooling the discharge lamp 90 according to the installation attitude SA of the projector 500; detecting the installation attitude SA of the projector 500; and putting out the discharge lamp 90 in a case where the detected installation attitude SA of the projector 500 is the reverse vertical attitude AP3 (predetermined attitude UA) which is different from both of the horizontal attitude AP1 for projecting the horizontally long image GS and the vertical attitude AP2 for projecting the vertically long image GL.

In a case where the installation attitude SA of the projector is the predetermined attitude UA, the discharge lamp cannot be sufficiently cooled by the cooling device. Thus, if the discharge lamp is continuously lighted in the predetermined attitude UA, the temperature of the discharge lamp increases, and thus there is a problem in that deterioration in the discharge lamp accelerates. The discharge lamp may be damaged, and thus the projector may be damaged.

In contrast, according to the present embodiment, in a case where the installation attitude SA of the projector 500 is the predetermined attitude UA, the control device 40 controls the discharge lamp driving unit 230 to put out the discharge lamp 90. Thus, it is possible to prevent a state in which the discharge lamp 90 is insufficiently cooled from lasting for a long period of time. Consequently, it is possible to improve the service life of the discharge lamp 90. It is possible to prevent the discharge lamp 90 and the projector 500 from being damaged.

For example, if a cooling device which can sufficiently cool the discharge lamp so as to cope with all installation attitudes SA of the projector is mounted in the projector, the above-described problem may be solved. However, since it is necessary for such a cooling device to be able to send cooled air, for example, in all directions, an air sending direction of the cooling device is required to be controlled through electrical control. Consequently, a structure of the cooling device becomes complex, and thus the cooling device tends to be large-sized. Therefore, there is a problem in that a projector is large-sized. Manufacturing cost of a cooling device increases. The time and effort to control an air sending direction of a cooling device increase, and thus manufacturing cost of a control device also increases. Therefore, there is a problem in that manufacturing cost of a projector increases.

In relation to these problems, the opening/closing mechanism of the cooling device 50 of the present embodiment can change an air sending direction of the cooling device 50 mechanically and automatically by using the gravity according to the installation attitude SA of the projector 500. Thus, a structure of the cooling device 50 can be simplified, and the discharge lamp 90 can be sufficiently cooled so as to cope with the installation attitude SA of the projector 500 to some extent. Complex control for controlling an air sending direction of the cooling device 50 is not necessary. Therefore, it is possible to prevent an increase in a size of the projector 500 and also to reduce manufacturing cost of the projector 500.

On the other hand, in a projector which can project the horizontally long image GS and the vertically long image GL, such as the projector 500, the advantage that two attitudes which are vertically reverse to each other are employed as attitudes for projecting the vertically long image GL is not great. Specifically, in a case where the vertically long image GL can be projected in the vertical attitude AP2, the advantage that the vertically long image GL can also be projected in the reverse vertical attitude AP3 is not great. In other words, as long as the vertically long image GL can be projected in only one of the vertical attitude AP2 and the reverse vertical attitude AP3, it is possible to realize a sufficient function of a projector which can project the vertically long image GL.

Therefore, a projector coping with all installation attitudes SA causes an increase in a size of the projector and an increase in manufacturing cost thereof, and achieved advantages are few. In contrast, in the projector 500 of the present embodiment, a structure of the cooling device 50 is simple, the projector 500 can be installed in predetermined installation attitudes SA, and the discharge lamp 90 is put out in the predetermined attitude UA. Consequently, it is possible to realize a sufficient function of a projector which can project the horizontally long image GS and the vertically long image GL, to implement the projector 500 which is small-sized at low cost, and to improve the service life of the discharge lamp 90.

According to the present embodiment, the predetermined attitude UA in which the discharge lamp 90 is put out includes the reverse vertical attitude AP3 in which the first electrode 92 and the second electrode 93 are arranged in the vertical direction. The reverse vertical attitude AP3 is an attitude in which the arrangement of the first electrode 92 and the second electrode 93 is vertically reverse to the vertical attitude AP2. In a case where the opening/closing mechanism changing an air sending direction of a cooling device has a simple configuration as in the cooling device 50 of the present embodiment, it is also difficult to sufficiently cool the discharge lamp in the reverse vertical attitude AP3 in addition to the horizontal attitude AP1 and the vertical attitude AP2. As described above, the advantage that both of the vertical attitude AP2 and the reverse vertical attitude AP3 are employed as attitudes for projecting the vertically long image GL is not great. Thus, it is possible to simplify a structure of the cooling device 50 and to improve the service life of the discharge lamp 90 by putting out the discharge lamp 90 in the reverse vertical attitude AP3 as the predetermined attitude UA.

According to the present embodiment, the predetermined attitude UA is an attitude in which the discharge lamp 90 is insufficiently cooled by the cooling device 50. Thus, if the discharge lamp 90 is put out in the predetermined attitude UA, the temperature of the discharge lamp 90 can be prevented from increasing to an excessively high temperature, and thus the service life of the discharge lamp 90 can be improved.

According to the present embodiment, the vertical attitude AP2 is an attitude obtained by rotating the projector 500 so that a projection direction of light projected from the projection optical system 350 is substantially the same as that in the horizontal attitude AP1. Thus, even if the projector 500 is vertically or horizontally disposed, an image can be projected onto the screen 700. Consequently, it is possible to improve a user's convenience.

According to the present embodiment, in a case where the installation attitude SA of the projector 500 is the predetermined attitude UA, a notification of a warning is performed, and thus a user can quickly recognize abnormal installation of the projector 500 and take a countermeasure against the abnormal installation. Since the discharge lamp 90 is put out after a predetermined time elapses from the notification of the warning, the discharge lamp 90 is not suddenly put out, and thus a user is not bewildered. As mentioned above, it is possible to implement the projector 500 which is excellent in convenience for a user.

The invention is not limited to the above-described embodiment and may have other configurations. In the following description, the same constituent elements as in the above description are given the same reference numerals as appropriate, and description thereof will be omitted in some cases.

In the above description, a case where the installation attitude SA of the projector 500 is the predetermined attitude UA, the control device 40 turns off the power source of the projector 500, but is not limited thereto. In a case where the installation attitude SA of the projector 500 is the predetermined attitude UA, the power source of the projector 500 may be turned on if the discharge lamp 90 is put out. In this case, for example, the projector 500 is in a standby state in which the driving current I is not supplied to the discharge lamp 90, and the discharge lamp 90 is lighted again after the installation attitude SA is corrected to the appropriate installation attitude SA.

In a case where the power source of the projector 500 is turned off, the control device 40 determines whether or not a predetermined time has elapsed from a notification of a warning such as a warning message, but is not limited thereto. There may be a configuration in which the control device 40 determines whether or not a predetermined time has elapsed from detection of the predetermined attitude UA of the projector 500 using the acceleration sensor 46.

The control device 40 may set a setting attitude CA of the projector 500. In this case, the input unit 45 receives an input of the setting attitude CA of the projector 500. For example, in a case where a user inputs the setting attitude CA to the input unit 45, the control device 40 sets the setting attitude CA according to the input received by the input unit 45. The setting attitude CA is an attitude in which operations of various optical systems of the projector 500 and the cooling device 50 are optimized in a case where the installation attitude SA of the projector 500 is the setting attitude CA.

For example, in a case where the horizontal attitude AP1 is set as the setting attitude CA, various optical systems of the projector 500 are adjusted so that the horizontally long image GS is projected from the projection optical system 350. In a case where the vertical attitude AP2 is set as the setting attitude CA, various optical systems of the projector 500 are adjusted so that the vertically long image GL is projected from the projection optical system 350.

For example, in a case where the setting attitude CA is set, an output from the cooling device 50 is adjusted so that cooling of the discharge lamp 90 is preferable at each attitude. In other words, the control device 40 changes an output from the cooling device 50 according to the setting attitude CA. For example, since cooled air hardly comes into contact with the most heated portion (third wall 510c) of the discharge lamp 90 in the vertical attitude AP2 compared with the horizontal attitude AP1, the cooling efficiency for the discharge lamp 90 may be reduced if an output from the cooling device 50 is the same as an output in a case of the horizontal attitude AP1. Thus, for example, in a case where the setting attitude CA is set to the vertical attitude AP2, the control device 40 increases an output from the cooling device 50 compared with a case of the horizontal attitude AP1. Consequently, it is possible to appropriately cool the discharge lamp 90 even in the vertical attitude AP2. Therefore, it is possible to appropriately cool the discharge lamp 90 at each attitude and thus to further improve the service life of the discharge lamp 90.

For example, attitude information regarding the setting attitude CA of the projector 500 is stored in advance in the storage unit 44 of the projector 500. In a case where the power source of the projector 500 is turned on for the first time, or a user has not changed the setting attitude CA, the setting attitude CA is set to the attitude information stored in advance in the storage unit 44. The attitude information stored in the storage unit 44 in advance is, for example, the horizontal attitude AP1.

Figure 12:
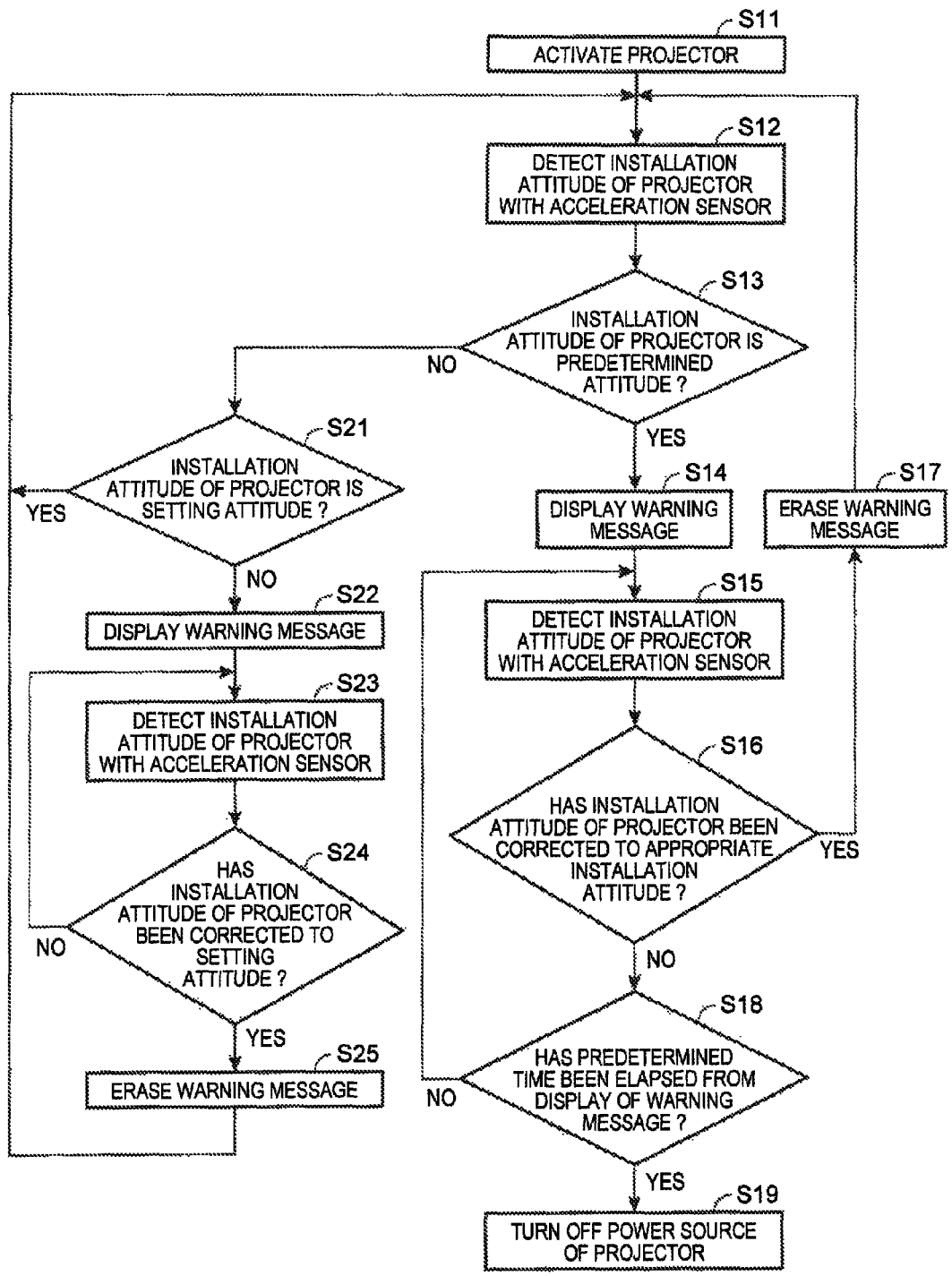
FIG. 12 is a flowchart illustrating other examples of control procedures in the controller according to the present embodiment.

In case where the setting attitude CA of the projector 500 is set, the control device 40 may perform control procedures as illustrated in FIG. 12. FIG. 12 is a flowchart illustrating other examples of control procedures in the control device 40 according to the present embodiment.

As illustrated in FIG. 12, in a case where the installation attitude SA of the projector 500 is not the predetermined attitude UA (NO in step S13) the control device 40 determines whether or not the installation attitude SA of the projector 500 is the setting attitude CA (step S21). In a case where the installation attitude SA of the projector 500 is the setting attitude CA (YES in step S21), the control device 40 maintains the activation state of the projector 500 without change, and continuously monitors the installation attitude SA by using the acceleration sensor 46.

On the other hand, in a case where the installation attitude SA of the projector 500 is different from the setting attitude CA (NO in step S21), the control device 40 displays a warning message (step S22). In other words, in a case where the installation attitude SA of the projector 500 is different from the setting attitude CA, the control device 40 performs a notification of a warning. The content of the warning of which the notification is performed in this case includes that the installation attitude SA of the projector 500 is different from the setting attitude CA; the installation attitude SA of the projector 500 is prompted to be corrected to the setting attitude CA; and the setting attitude CA is prompted to be corrected in accordance with the present installation attitude SA. The remaining content is the same as in the warning of which a notification is performed in the above step S14.

After the notification of the warning is performed, the control device 40 detects the installation attitude SA again by using the acceleration sensor 46 (step S23), and determines whether or not the installation attitude SA has been corrected to the setting attitude CA (step S24). In a case where installation attitude SA of the projector 500 has been corrected to setting attitude CA (YES in step S24), the control device 40 erases the warning message (step S25), and maintains the activation state of the projector 500. Not only in a case where the installation attitude SA has been corrected to the setting attitude CA, but also in a case where the setting attitude CA is corrected in accordance with the present installation attitude SA, the control of the control device 40 proceeds to step S25 from step S24.

On the other hand, in a case where the installation attitude SA of the projector 500 is still different from the setting attitude CA (NO in step S24), the control device 40 continuously monitors the installation attitude SA of the projector 500, and continuously performs the notification of the warning until the installation attitude SA of the projector 500 becomes the setting attitude CA.

According to the above-described configuration, since a notification of a warning is performed in a case where the installation attitude SA of the projector 500 is different from the setting attitude CA, a user can quickly recognize an error of the installation attitude SA. Consequently, it is possible to improve a user's convenience. It is possible to make an image output state and a cooling state of the discharge lamp 90 appropriate according to the installation attitude SA by correcting the installation attitude SA to the setting attitude CA. Therefore, it is possible to further improve the service life of the discharge lamp 90.

Here, a direction in which cooled air of the cooling device 50 is sent is automatically changed according to the installation attitude SA of the projector 500 by the opening/closing mechanism, and thus it is possible to send cooled air to an appropriate location of the discharge lamp 90 according to the installation attitude SA of the projector 500. Thus, even in a case where the installation attitude SA is different from the setting attitude CA, it is possible to prevent cooling of the discharge lamp 90 from being insufficient if the installation attitude SA is the appropriate installation attitude SA. Therefore, in a case where the installation attitude SA of the projector 500 is different from the setting attitude CA, it is possible to prevent deterioration in the discharge lamp 90 even if the discharge lamp 90 is not put out, which is different from a case where the installation attitude SA is the predetermined attitude UA.

In a case where the installation attitude SA of the projector 500 is the predetermined attitude UA, the control device 40 performs control based on the control procedures illustrated in FIG. 11.

As described above, even in a case where the setting attitude CA is set, the control device 40 determines whether or not the installation attitude SA is predetermined attitude UA on the basis of only the installation attitude SA detected by the acceleration sensor 46 without comparing the installation attitude SA with the setting attitude CA. For example, in a case where it is determined whether or not the discharge lamp is put out on the basis of whether or not the installation attitude SA of the projector 500 matches the setting attitude CA, if the setting attitude CA is wrongly set to the predetermined attitude UA, the discharge lamp may be continuously lighted in the predetermined attitude UA in some case. In contrast, according to the above-described configuration, since it is determined whether or not the installation attitude SA is the predetermined attitude UA regardless of the setting attitude CA, it is possible to appropriately put out the discharge lamp 90 even if the setting attitude CA is wrongly set to the predetermined attitude UA. Consequently, it is possible to further improve the service life of the discharge lamp 90 and thus to implement the projector 500 with high reliability.

The respective configurations described in the embodiment may be combined with each other as appropriate so as not to cause contradiction therebetween.

In the above-described embodiment, a description has been made of an example of a case where the invention is applied to the transmissive projector, but the invention is applicable to a reflective projector. Here, the term "transmissive" indicates a type in which a liquid crystal light valve including a liquid crystal panel be like transmits light therethrough. The term "reflective" indicates a type in which the liquid crystal light valve reflects light. A light modulation device is not limited to a liquid crystal panel or the like, and may be a light modulation device using, for example, micro-mirror.

In the above-described embodiment, a description has been made of an example of the projector 500 using the three liquid crystal panels 560R, 560G and 560B (the liquid crystal light valves 3308, 330G and 330B), but the invention is applicable to a projector using only a single liquid crystal panel, and to a projector using four or more liquid crystal panels.

The entire disclosure of Japanese Patent Application No. 2016-008503, filed Jan. 20, 2016 is expressly incorporated by reference herein.

What is claimed is:

1. A projector configured to project a horizontally long image and a vertically long image, comprising:
    a discharge lamp which is provided with a first electrode and a second electrode and configured to emit light;
    a discharge lamp driving unit configured to supply a driving current to the discharge lamp;
    a light modulation device configured to modulate the light emitted from the discharge lamp according to image information;
    a projection optical device configured to project the light modulated by the light modulation device;

a cooling unit configured to cool the discharge lamp according to an installation attitude of the projector;
a detection unit configured to detect the installation attitude; and
a controller configured to control the discharge lamp driving unit and the cooling unit,
wherein the installation attitude includes a first attitude for projecting the horizontally long image and a second attitude for projecting the vertically long image,
wherein the controller is configured to put out the discharge lamp in a case where the installation attitude detected by the detection unit is a third attitude which is different from both of the first attitude and the second attitude
wherein the second attitude and the third attitude are attitudes in which the first electrode and the second electrode are disposed to be arranged in a vertical direction,
wherein, in the second attitude, one of the first electrode and the second electrode is disposed further toward a vertically upper side than an other electrode of the first electrode and second electrode, and
wherein, in the third attitude, the other electrode is disposed further toward the vertically upper side than the one electrode.

2. The projector according to claim 1, further comprising:
an input unit configured to receive an input of a setting attitude of the projector,
wherein the controller is configured to set the setting attitude according to the input received by the input unit, and
wherein the controller is configured to perform a notification of a warning in a case where the detected installation attitude is different from the setting attitude.

3. The projector according to claim 2,
wherein the controller is configured to change an output from the cooling unit according to the setting attitude.

4. A projector configured to project a horizontally long image and a vertically long image, comprising:
a discharge lamp which is provided with a first electrode and a second electrode and configured to emit light;
a discharge lamp driving unit configured to supply a driving current to the discharge lamp;
a light modulation device configured to modulate the light emitted from the discharge lamp according to image information;
a projection optical device configured to project the light modulated by the light modulation device;
a cooling unit configured to cool the discharge lamp according to an installation attitude of the projector;
a detection unit configured to detect the installation attitude; and
a controller configured to control the discharge lamp driving unit and the cooling unit,
wherein the installation attitude includes a first attitude for projecting the horizontally long image and a second attitude for projecting the vertically long image,
wherein the controller is configured to put out the discharge lamp in a case where the installation attitude detected by the detection unit is a third attitude which is different from both of the first attitude and the second attitude, and
wherein the third attitude is an attitude in which the discharge lamp is insufficiently cooled by the cooling unit.

5. The projector according to claim 4, further comprising:
an input unit configured to receive an input of a setting attitude of the projector,
wherein the controller is configured to set the setting attitude according to the input received by the input unit, and
wherein the controller is configured to perform a notification of a warning in a case where the detected installation attitude is different from the setting attitude.

6. The projector according to claim 5,
wherein the controller is configured to change an output from the cooling unit according to the setting attitude.

7. A projector configured to project a horizontally long image and a vertically long image, comprising:
a discharge lamp which is provided with a first electrode and a second electrode and configured to emit light;
a discharge lamp driving unit configured to supply a driving current to the discharge lamp;
a light modulation device configured to modulate the light emitted from the discharge lamp according to image information;
a projection optical device configured to project the light modulated by the light modulation device;
a cooling unit configured to cool the discharge lamp according to an installation attitude of the projector;
a detection unit configured to detect the installation attitude; and
a controller configured to control the discharge lamp driving unit and the cooling unit,
wherein the installation attitude includes a first attitude for projecting the horizontally long image and a second attitude for projecting the vertically long image,
wherein the controller is configured to put out the discharge lamp in a case where the installation attitude detected by the detection unit is a third attitude which is different from both of the first attitude and the second attitude, and
wherein the second attitude is an attitude obtained by rotating the projector so that a projection direction of light projected from the projection optical device is substantially the same as a projection direction of light in the first attitude.

8. The projector according to claim 7, further comprising:
an input unit configured to receive an input of a setting attitude of the projector,
wherein the controller is configured to set the setting attitude according to the input received by the input unit, and
wherein the controller is configured to perform a notification of a warning in a case where the detected installation attitude is different from the setting attitude.

9. The projector according to claim 8,
wherein the controller is configured to change an output from the cooling unit according to the setting attitude.

10. A projector configured to project a horizontally long image and a vertically long image, comprising:
a discharge lamp which is provided with a first electrode and a second electrode and configured to emit light;
a discharge lamp driving unit configured to supply a driving current to the discharge lamp;
a light modulation device configured to modulate the light emitted from the discharge lamp according to image information;
a projection optical device configured to project the light modulated by the light modulation device;
a cooling unit configured to cool the discharge lamp according to an installation attitude of the projector;

a detection unit configured to detect the installation attitude; and a controller configured to control the discharge lamp driving unit and the cooling unit, wherein the installation attitude includes a first attitude for projecting the horizontally long image and a second attitude for projecting the vertically long image, wherein the controller is configured to put out the discharge lamp in a case where the installation attitude detected by the detection unit is a third attitude which is different from both of the first attitude and the second attitude, wherein the controller is configured to perform a notification of a warning in a case where the detected installation attitude is the third attitude, and wherein the controller is configured to put out the discharge lamp after a predetermined time elapses from the notification of the warning.

11. The projector according to claim 10, further comprising:

an input unit configured to receive an input of a setting attitude of the projector, wherein the controller is configured to set the setting attitude according to the input received by the input unit, and wherein the controller is configured to perform a notification of a warning in a case where the detected installation attitude is different from the setting attitude.

12. The projector according to claim 11, wherein the controller is configured to change an output from the cooling unit according to the setting attitude.

13. A control method for a projector which includes a discharge lamp emitting light and configured to project a horizontally long image and a vertically long image, the method comprising:

cooling the discharge lamp according to an installation attitude of the projector;

detecting the installation attitude; and putting out the discharge lamp in a case where the detected installation attitude is a third attitude which is different from both of a first attitude for projecting the horizontally long image and a second attitude for projecting the vertically long image, wherein the second attitude and the third attitude are attitudes in which the first electrode and the second electrode are disposed to be arranged in a vertical direction, wherein, in the second attitude, one of the first electrode and the second electrode is disposed further toward a vertically upper side than an other electrode of the first electrode and the second electrode, and wherein, in the third attitude, the other electrode is disposed further toward the vertically upper side than the one electrode.

* * * * *